US012789527B2

(12) United States Patent
Shimotsusa et al.

(10) Patent No.: US 12,789,527 B2
(45) Date of Patent: Nov. 10, 2026

(54) LIQUID EJECTION APPARATUS AND LIQUID EJECTION HEAD

(71) Applicant: CANON KABUSHIKI KAISHA, Tokyo (JP)

(72) Inventors: Mineo Shimotsusa, Tokyo (JP); Nobuyuki Hirayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 18/599,539

(22) Filed: Mar. 8, 2024

(65) Prior Publication Data

US 2024/0300240 A1 Sep. 12, 2024

(30) Foreign Application Priority Data

Mar. 10, 2023 (JP) ................................ 2023-037881

(51) Int. Cl.
*B41J 2/45* (2006.01)
*B41J 2/045* (2006.01)
*B41J 2/14* (2006.01)

(52) U.S. Cl.
CPC ....... *B41J 2/14153* (2013.01); *B41J 2/04563* (2013.01); *B41J 2/0458* (2013.01); *B41J 2/14056* (2013.01); *B41J 2/14064* (2013.01); *B41J 2/14072* (2013.01); *B41J 2002/14177* (2013.01); *B41J 2002/14354* (2013.01)

(58) Field of Classification Search
CPC ............................................ B41J 2002/14354
See application file for complete search history.

(56) References Cited

U.S. PATENT DOCUMENTS 4,870,433 A * 9/1989 Campbell ............ B41J 2/14129 347/62
10,882,314 B2 1/2021 Shimotsusa et al.
11,524,497 B2 12/2022 Shimotsusa et al.
2010/0039477 A1* 2/2010 Kuk ..................... B41J 2/14072 347/62
2021/0016570 A1* 1/2021 Goto .................... B41J 2/14427
2021/0370670 A1* 12/2021 Nomura ............... B41J 2/04563
2023/0088227 A1* 3/2023 Shimotsusa .......... B41J 2/14153 347/14
2025/0144934 A1* 5/2025 Nomura ................ B41J 2/0458

FOREIGN PATENT DOCUMENTS

JP 2019-072999 A 5/2019

* cited by examiner

*Primary Examiner* — Shelby L Fidler
(74) *Attorney, Agent, or Firm* — Venable LLP

(57) ABSTRACT

To make it possible to detect a difference in a change of temperature of liquid accompanying ejection of ink between normal ejection and ejection failure, a liquid ejection apparatus includes a driving unit configured to drive a heating element; and a detection unit configured to detect an ejection state of a liquid ejection head based on an output from a temperature detection element provided in the liquid ejection head. The liquid ejection head includes, in correspondence to the ejection port, a foaming chamber communicating with the ejection port; a first heating element for ejecting liquid by providing thermal energy to liquid in the foaming chamber; the temperature detection element for detecting temperature in the foaming chamber; and a second heating element generating thermal energy and arranged closer to the temperature detection element than the first heating element.

18 Claims, 14 Drawing Sheets

DRIVING PULSE

HEATING PULSE

OUTPUT VOLTAGE OF DETECTION ELEMENT

DRIVING PULSE

OUTPUT VOLTAGE OF DETECTION ELEMENT

DRIVING PULSE

OUTPUT VOLTAGE OF DETECTION ELEMENT

LIQUID EJECTION APPARATUS AND LIQUID EJECTION HEAD

BACKGROUND OF THE INVENTION

Field of the Invention

The present disclosure relates to a liquid ejection apparatus and a liquid ejection head, and in detail, relates to a technique for detecting temperature of a liquid ejection head.

Description of the Related Art

As this type of technique, Japanese Patent Laid-Open No. 2019-072999 has described that a temperature detection element is provided for each ejection port of the liquid ejection head and based on the temperature detected by this element, ejection failure at the ejection port is detected. In detail, the temperature detection element detects the ink temperature within the ejection port, which changes accompanying ink ejection, and based on the difference in the change in temperature between normal ejection and ejection failure, detects ejection failure of the ejection port. As regards the temperature detection, Japanese Patent Laid-Open No. 2019-072999 has disclosed that an insulation film interposed between an anti-cavitation film coming into contact with ink and the temperature detection element is reduced in thickness, and due to this, a reduction in the heat quantity of ink, which propagates to the temperature detection element, is suppressed. A result of this, the heat quantity received by the temperature detection element in a case of detecting the temperature of ink is increased as much as possible and thereby the relative sensitivity of the detection element for detecting the above-described difference in the change in temperature between normal ejection and ejection failure is improved.

However, there is a case where the heat quantity received by the temperature detection element is insufficient and as a result of that, there is a case where the voltage or the like relating to the change in temperature is small, which the temperature detection element outputs. Then, in a case where the voltage or the like is small as described above, which is output from the temperature detection element, with the configuration disclosed in Japanese Patent Laid-Open No. 2019-072999, in which the change in temperature of ink is detected by using the temperature detection element, it is not possible to clearly detect the difference in the change in temperature between normal ejection and ejection failure.

SUMMARY OF THE INVENTION

An object of the present disclosure is to provide a liquid ejection apparatus and a liquid ejection head capable of making it possible to clearly detect the difference in the change in temperature of liquid accompanying ejection of liquid between normal ejection and ejection failure.

The liquid ejection apparatus according to the present disclosure is a liquid ejection apparatus using a liquid ejection head and ejecting liquid from the liquid ejection head, and including: a driving unit configured to drive a heating element; and a detection unit configured to detect an ejection state of the liquid ejection head based on an output from a temperature detection element provided in the liquid ejection head in a case where the driving unit drives the heating element to eject liquid from an ejection port of the liquid ejection head, wherein the liquid ejection head includes, in correspondence to the ejection port: a foaming chamber communicating with the ejection port; a first heating element for ejecting liquid from the ejection port by providing thermal energy to liquid in the foaming chamber; the temperature detection element for detecting temperature in the foaming chamber; and a second heating element generating thermal energy and arranged closer to the temperature detection element than the first heating element.

Further features of the present invention will become apparent from the following description of exemplary embodiments with reference to the attached drawings.

DESCRIPTION OF THE EMBODIMENTS

In the following, embodiments of the present disclosure are explained in detail with reference to the drawings. In the following explanation and the drawings, to each of same or similar elements and configurations, a common symbol is assigned and explanation of those elements and the like is omitted as appropriate.

Figure 1:
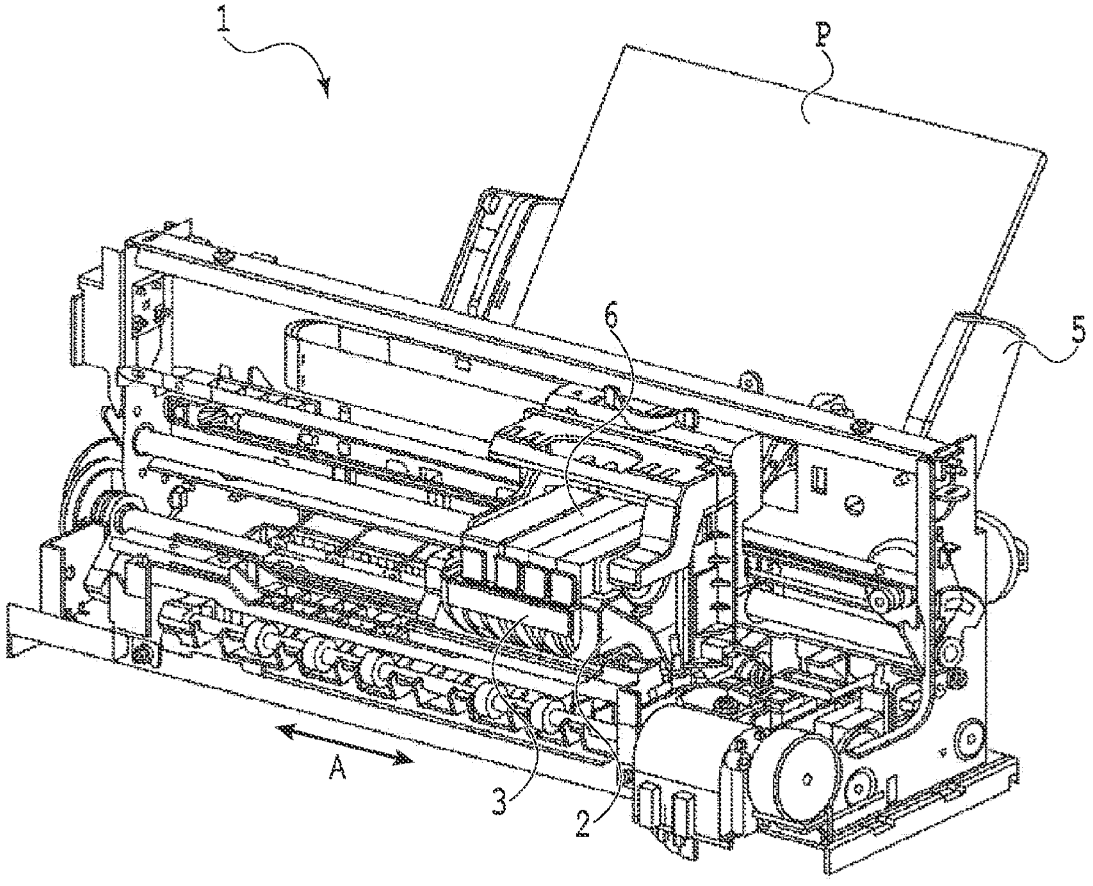
FIG. 1 is an outer appearance perspective diagram showing an outline of a printing apparatus configuration performing printing by using a liquid ejection head according to one embodiment of the present disclosure.

FIG. 1 is an outer appearance perspective diagram showing an outline of a printing apparatus configuration performing printing by using a liquid ejection head (in the following, also called "print head") according to one embodiment of the present disclosure.

As shown in FIG. 1, an ink jet printing apparatus 1 as a liquid ejection apparatus comprises a print head 3 for performing printing by ejecting ink as liquid and a carriage 2 mounting the print head 3 and capable of reciprocating in the direction of an arrow A. On the carriage 2, an ink tank storing ink to be supplied to the print head 3 is mounted detachably. The ink tank 6 is provided for storing each ink of magenta (M), cyan (C), yellow (Y), and black (K) and from each ink tank, ink is supplied to each corresponding ejection segment of the print head 3. Further, the printing apparatus 1 feeds a printing medium P, such as printing paper, by a sheet feeding mechanism 5 and conveys the fed printing medium P to a printing area of the print head by a conveyance mechanism, not shown schematically, and discharges the printing medium P from the printing area. In these configurations, for the printing medium P conveyed to the printing area, the carriage 2 is moved to cause the print head 3 to perform scanning and during the scanning, the print head is caused to eject ink and a character, an image or the like is printed on the printing medium P.

The print head 3 adopts the method of causing air bubbles to occur in ink by utilizing thermal energy and ejecting the ink by the pressure of the air bubbles and comprises a heating resistance element or heater (in the following, these are also called "heating element") for generating thermal energy. This heater is provided in correspondence to each ink ejection port and capable of ejecting ink from the corresponding ejection port by the application of a pulse voltage to the corresponding heater in accordance with an ejection signal. The application of the present disclosure is not limited to the serial type printing apparatus to be explained in the present embodiment. It is also possible to apply the present disclosure to a full-line type printing apparatus performing printing using a print head (line head) in which ejection ports are arrayed in accordance with the width of a printing medium that is conveyed and this is obvious from the following explanation.

Figure 2:
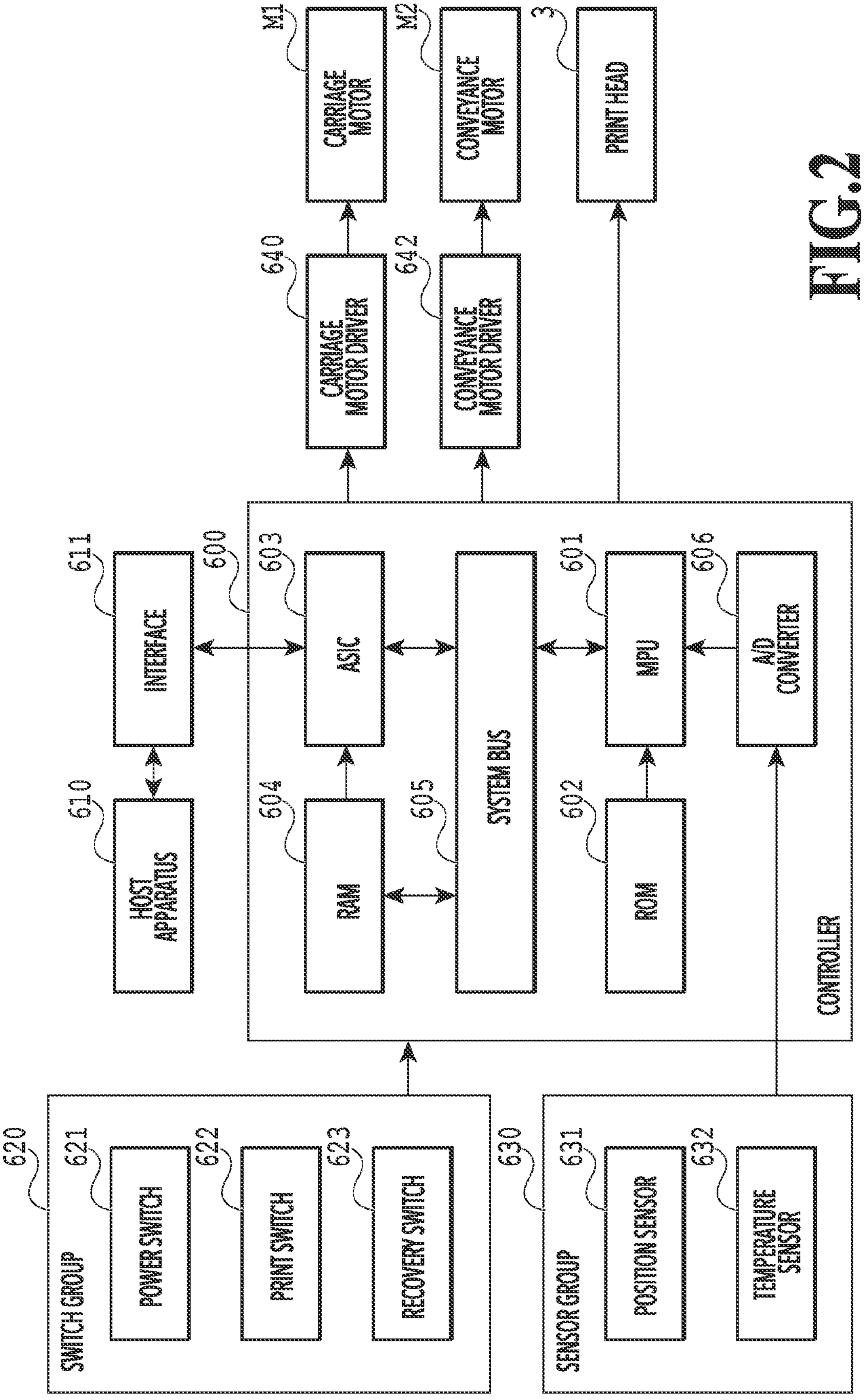
FIG. 2 is a block diagram showing a control configuration of the printing apparatus shown in FIG. 1.

FIG. 2 is a block diagram showing the control configuration of the printing apparatus 1 shown in FIG. 1.

As shown in FIG. 2, a controller 600 is configured by having an MPU 601, a ROM 602, an application specific integrated circuit (ASIC) 603, a RAM 604, a system bus 605, and an A/D converter 606. Here, the ROM 602 stores programs corresponding to control sequences, such as the ejection operation of the print head, predetermined tables, and other fixed data. The ASIC 603 controls the drive of a motor M1 for moving the carriage 2 via a carriage motor driver 640 and further controls the drive of a conveyance motor M2 relating to printing medium conveyance via a conveyance motor driver 642. Further, the ASIC 603 generates a control signal for controlling the ejection of the print head 3. The RAM 604 is used as a rasterizing area of image data, a work area for executing programs, and the like. The system bus 605 connects the MPU 601, the ASIC 603, and RAM 604 to one another and performs transmission and reception of data. The A/D converter 606 inputs an analog signal from a sensor group, to be explained in the following, performs A/D conversion, and supplies a digital signal to the MPU 601.

Further, 610 indicates a host apparatus, such as a PC, which is a supply source of image data. Between the host apparatus 610 and the printing apparatus 1, image data, commands, status and the like are transmitted and received by packet communication via an interface (I/F) 611. It may also be possible to comprise a USB interface as the interface 611 separate from a network interface and enable reception of bit data and raster data transferred serially from the host apparatus.

620 indicates a switch group and includes a power switch 621, a print switch 622, a recover switch 623 and the like. 630 indicates a sensor group for detecting the apparatus state. The sensor group 630 is configured by including a position sensor 631 detecting the scan position of the print head, a temperature sensor (temperature detection element) 632 detecting the temperature of each ejection segment of the print head, and the like. Temperature information (voltage information) detected and output by the temperature detection element 632 is converted into a digital signal by the A/D converter 606 and input to the MPU 601. Then, the MPU 601 detects the ejection state based on the temperature information. Specifically, the MPU 601 determines normal ejection and ejection failure in the change in temperature, to be described later in FIG. 5 and the like.

In the above configuration, the ASIC 603 transfers data for driving the heating element (heater) to the print head while directly accessing the storage area of the RAM 604 in a case of the printing scan by the print head 3. In addition, the printing apparatus comprises a display unit (not shown schematically) including an LCD or LED, as a user interface.

Figure 3:
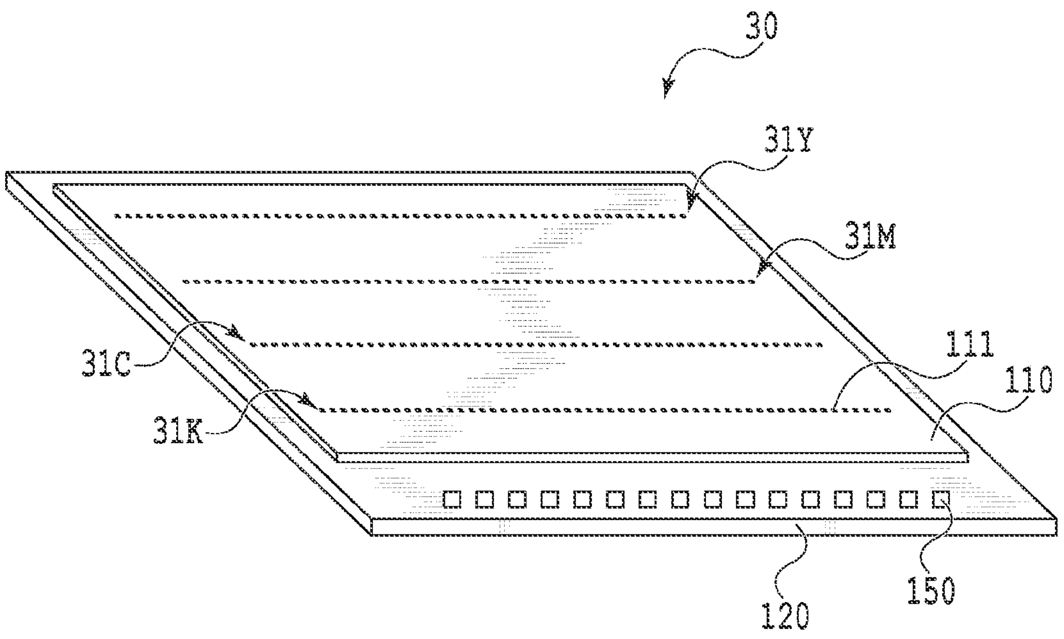
FIG. 3 is a perspective diagram showing an element substrate configuring a print head shown in FIG. 1.

FIG. 3 is a perspective diagram showing an element substrate configuring the print head shown in FIG. 1. The print head 3 is configured by an element substrate 30 being provided with a supply path or the like for supplying ink from the ink tank 6 to each ejection segment as well as being mounted at the lower portion of the carriage 2 shown in FIG. 1. As shown in FIG. 3, the printing element substrate 30 of the present embodiment comprises ejection port columns 31Y, 31M, 31C, and 31K corresponding to the Y, M, C, and K inks, respectively, and each ejection port column is configured by the array of 512 ejection ports 111. Then, in correspondence to each ejection port 111, an ejection segment whose detailed structure is shown in FIG. 4 or the like is configured.

In the printing element substrate 30, on a substrate 120, heating elements and wiring supplying electric power thereto, and the like are formed. Further, the printing element substrate 30 is formed by a nozzle forming member 110 for forming ejection ports and foaming chambers in correspondence to the heating elements being formed on the substrate 120 so as to cover these heating elements and the like. Furthermore, on the fringe of the substrate 120, electrode terminals 150 for predetermined wiring on the substrate to connect with external wiring are provided.

The example of the print head described above relates to an aspect in which the print head is mounted fixedly on the carriage, but of course the application of the present disclosure is not limited to this aspect. An aspect may also be acceptable in which the print head is attached to the carriage detachably.

As regards the print head 3 explained above, the configuration of the heating element and the temperature detection element according to the embodiment of the present disclosure is explained in the following.

First Embodiment

Figure 4A:
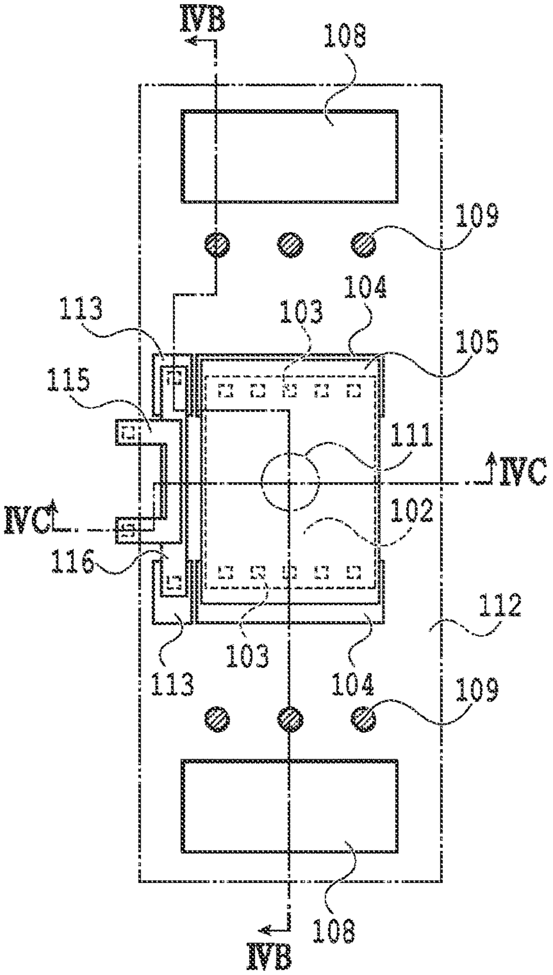
FIG. 4A to FIG. 4C are diagrams showing a structure of an ejection segment of a print head according to First Embodiment of the present disclosure.
Figure 4B:
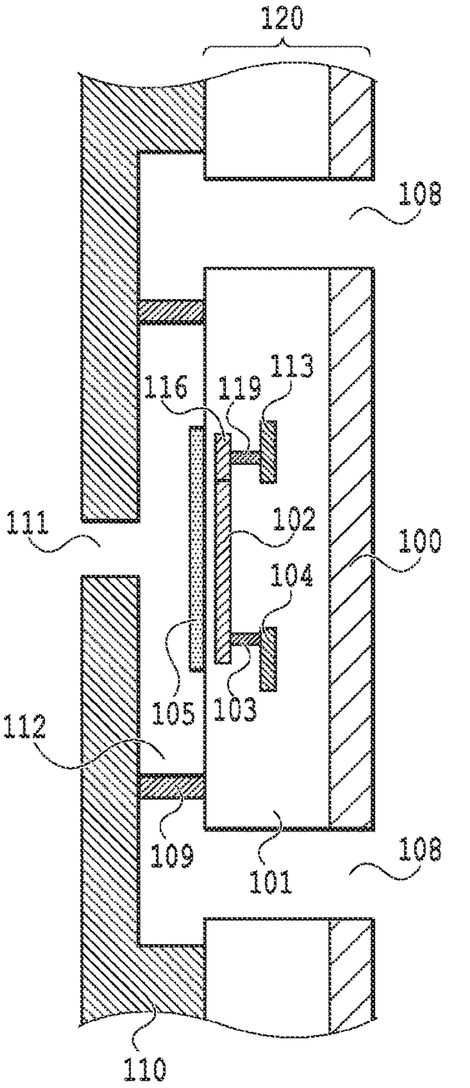
Figure 4C:
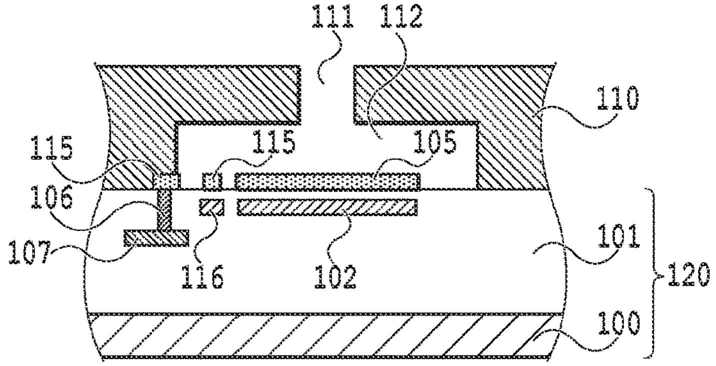

FIG. 4A to FIG. 4C are diagrams showing the structure of one ejection segment in the print head according to First Embodiment of the present disclosure. FIG. 4A is a schematic plan diagram showing the ejection segment by removing the nozzle forming member 110. Further, FIG. 4B is a schematic cross-sectional diagram showing a cross section along a IVB-IVB line in FIG. 4A by including the nozzle forming member 110 and FIG. 4C is a schematic cross-sectional diagram showing a cross section along a IVC-IVC line in FIG. 4A by including the nozzle forming member 110.

As shown in these drawings, the print head 3 or each ejection segment is formed by the nozzle forming member 110 provided with the ejection port 111 being formed on the substrate 120 having a layer structure of a base 100 and an insulation layer 101. Then, the concave portion of the nozzle forming member forms a foaming chamber 112 communicating with the ejection port 111. The nozzle forming member 110 is formed of a photosensitive resin. Further, with the foaming chamber 112, a supply port 108 formed so as to penetrate through the base 120 communicates. The substrate 120 is configured by having the base 100 and the insulation layer 101 formed thereon. The base 100 includes single-crystal silicon and the insulation layer 101 is formed of an inorganic material, for example, such as silicon oxide, and has electrical insulation properties as its characteristics.

Inside the insulation layer 101, a first heating element 102 including a heating resistor (electro-thermal converter) is provided. The first heating element 102 is connected to power supply wiring 104 via a via 103. The first heating element 102 is formed of a material having electrical resistance, for example, such as tantalum silicon nitride and tungsten silicon nitride.

At the top portion of the first heating element 102 and on the surface of the insulation layer 101, an anti-cavitation film 105 is provided so as to cover the whole of the heating element 102. That is, the anti-cavitation film 105 is provided so as to contain the effective area of the heating element 102. The anti-cavitation film 105 has the function to protect the first heating element 102, the insulation layer 101, a wiring layer and the like from cavitation that occurs in a case where ink is ejected. The anti-cavitation film 105 is a metal material or alloy whose mechanical strength or chemical strength is high, for example, such as iridium, tantalum, titanium, tungsten, silicon, tantalum silicon nitride, and tungsten silicon nitride, which is formed in a signal layer or lamination layer. Further, between the foaming chamber 112 and the supply port 108, a filter 109 for removing impurities in ink is arranged. This filter 109 is formed of, for example, a photosensitive resin.

Each ejection segment of the print head 3 having the above configuration generates thermal energy for the ink supplied to the foaming chamber 112 via the supply port 108 by the heating element 102 being driven based on ejection data. Due to this, air bubbles occur in ink and it is possible to eject the ink from the ejection port 111 by the foaming pressure of the air bubbles. Here, the foaming chamber 112 is an area contributing to the ejection of the ink and in a plan view shown in FIG. 4A, the foaming chamber 112 is predefined as an area one size larger than the first heating element 102. At least, the foaming chamber 112 is the area located on the side of the ejection port 111 with each of the wall (not shown schematically) of the nozzle forming member 110 defining the foaming chamber and the filter 109 as the boundary. The supply of the ink to the foaming chamber 112 is provided by the negative pressure state being brought about in the foaming chamber 112 accompanying the ink ejection from the ejection port 111, the ink being guided to the foaming chamber via the supply port 108 by the negative pressure, and the foaming chamber being filled with the ink.

Further, in the embodiment of the present disclosure, in the same layer as the anti-cavitation film 105, a temperature detection element 115 is provided. That is, on the surface of the insulation layer 101, the temperature detection element 115 is provided in the area a predetermined distance distant from the anti-cavitation film 105. In the present embodiment, the temperature detection element 115 is formed of the same material and in the same process as those of the anti-cavitation film 105. As above, by making the manufacturing process of the temperature detection element 115 the same as the manufacturing process of the anti-cavitation film 105 using the same material, the dedicated process of the temperature detection element 115 is no longer necessary, and therefore, it is made possible to reduce the manufacturing cost. The same material of the temperature detection element 115 as that of the anti-cavitation film 105 may be formed of, for example, a metal material or alloy whose resistance temperature coefficient is large, for example, such as iridium, tantalum, titanium, tungsten, silicon, tantalum silicon nitride, and tungsten silicon nitride, which is formed in a single layer or lamination layer. The temperature detection element 115 such as this is connected to signal wiring 107 via a via 106.

In the above-described explanation, the temperature detection element 115 is formed of the same material and in the same process as those of the anti-cavitation film 105, but the aspect is not limited to this. It may also be possible to form the temperature detection element 115 of a material and in a process different from those of the anti-cavitation film 105. That is, it is only required for the temperature detection element 115 to be formed as the layer on the surface of the insulation layer 101 and as the layer of the metal material capable of coming into contact with the ink in the foaming chamber 112 like the anti-cavitation film 105.

The above temperature detection element 115 is arranged so that at least part of which faces the foaming chamber 112. That is, the temperature detection element 115 is arranged at a position distant from the upper position other than the position above the first heating element 102. In this manner, it is possible for at least part of the temperature detection element 115 to come into contact with the ink operating in the foaming chamber 112 before and after ejection and during ejection. Due to this, it is possible to increase the heat quantity received from the ink in the foaming chamber by the temperature detection element 115, and therefore, it is made possible to improve the relative sensitivity of the temperature detection of the temperature detection element.

Further, in the present embodiment, as shown in FIG. 4A to FIG. 4C, a second heating element 116 for heating is provided at a position under the temperature detection element 115 and inside the insulation layer 101. The second heating element 116 is connected to power supply wiring 113 via a via 119 inside the insulation layer 101. It is possible to form the second heating element 116 of an electrical resistance material, for example, such as tantalum silicon nitride and tungsten silicon nitride, and it is preferable to form the second heating element 116 of the same material as that of the first heating element 102. Further, it is preferable to form the second heating element 116 in the same process as that of the first heating element 102.

As above, the second heating element 116 for heating is provided in the vicinity of the temperature detection element 115. That is, the second heating element 116 is provided closer to the temperature detection element 115 than the first heating element 102 for ejection. Due to this, it is possible for the second heating element 116 to directly heat the temperature detection element itself at timing of temperature detection and increase the output of the temperature detection element relating to temperature detection. As a result of that, as details will be described in FIG. 5 and the like, it is made possible to clearly determine normal ejection and ejection failure in the temperature detection of the temperature detection element 115.

The ejection segment of the present embodiment has the power supply wiring 104 and 113 and the signal wiring 107 as other configurations and these are formed of a metal material whose main component is, for example, aluminum and copper. The vias 103 and 106 are formed of a metal material whose main component is, for example, tungsten and copper. The uppermost surface of the insulation layer 101 is flattened. The flattening processing is performed by, for example, CMP (Chemical Mechanical Polishing). It may also be possible to perform the flattening processing before or after the formation process of the via, the signal wiring, the power supply wiring, the heating element, and the temperature detection element. The film thickness of the first heating element 102 is 10 to 50 nm and the film thickness of the power supply wiring 104 is 500 to 1,000 nm. As above, in the insulation layer 101, a plurality of conductive layers is provided, such as the multilayer wiring, not shown schematically, the first heating element 102, the second heating element 116, the vias 103 and 106, the power supply wiring 104 and 113, the signal wiring 107, the anti-cavitation film 105, and the temperature detection element 115.

The print head 3 ejects the ink in the foaming chamber 112 from the ejection port 111 by utilizing the thermal energy of the first heating element 102. After that, the refilling of the liquid in the foaming chamber 112 is performed by the supply of the ejected tailing ink and the ink via the supply port 108. The temperature detection element 115 detects a change in ink temperature in this case and due to this, it is possible to determine whether or not ink ejection is performed normally.

Figures 5A, 5B, 5C:
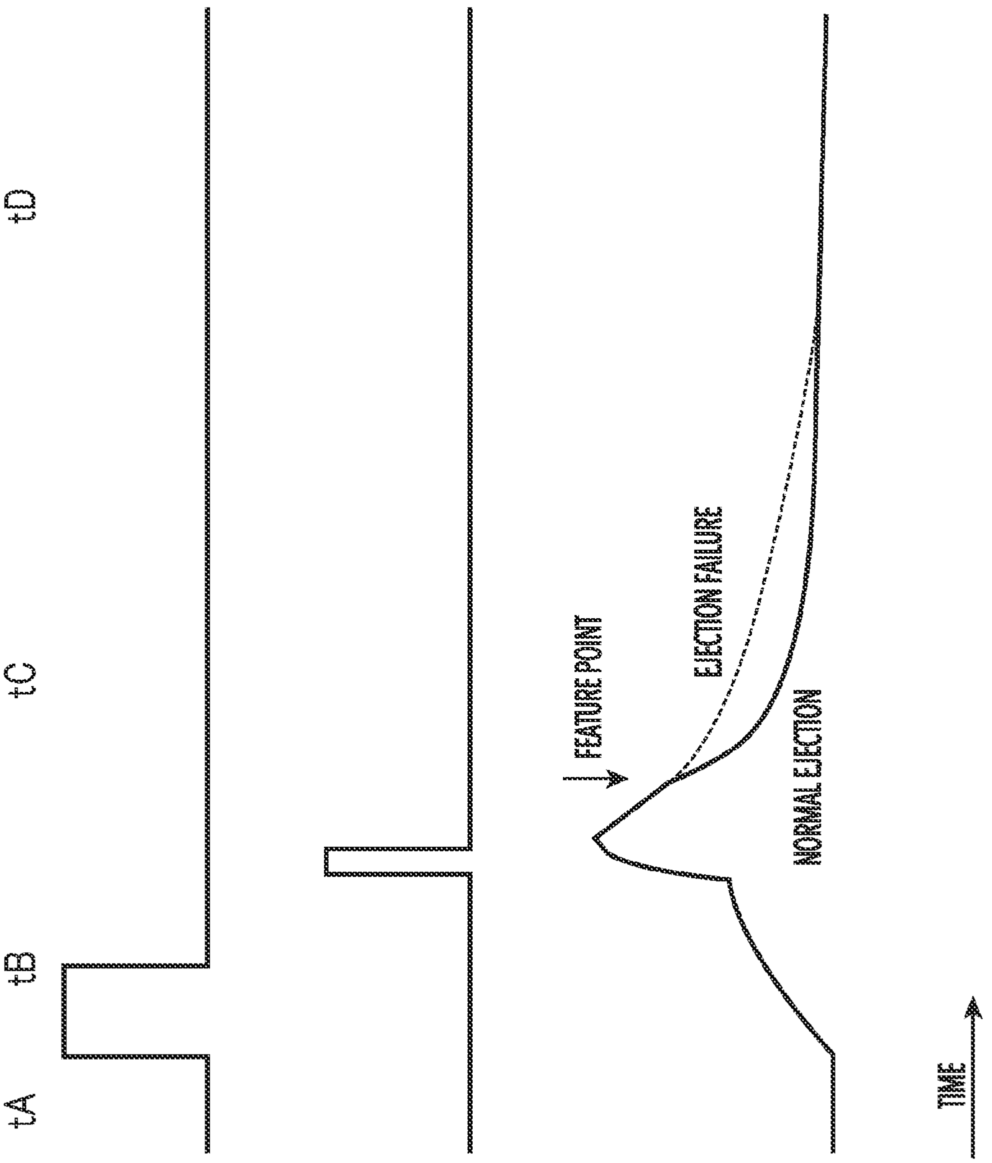
FIG. 5A to FIG. 5C are diagrams explaining temperature detection processing according to First Embodiment of the present disclosure.

FIG. 5A to FIG. 5C are diagrams explaining temperature detection processing according to First Embodiment of the present disclosure. FIG. 5A shows the waveform of a driving pulse to be applied to the first heating element 102 for ejection and FIG. 5B shows the waveform of a heating pulse to be applied to the second heating element 116 for heating, respectively. Further, FIG. 5C shows the waveform of an output voltage of the temperature detection element 115, which corresponds to a change in temperature to be detected.

Figure 6C:
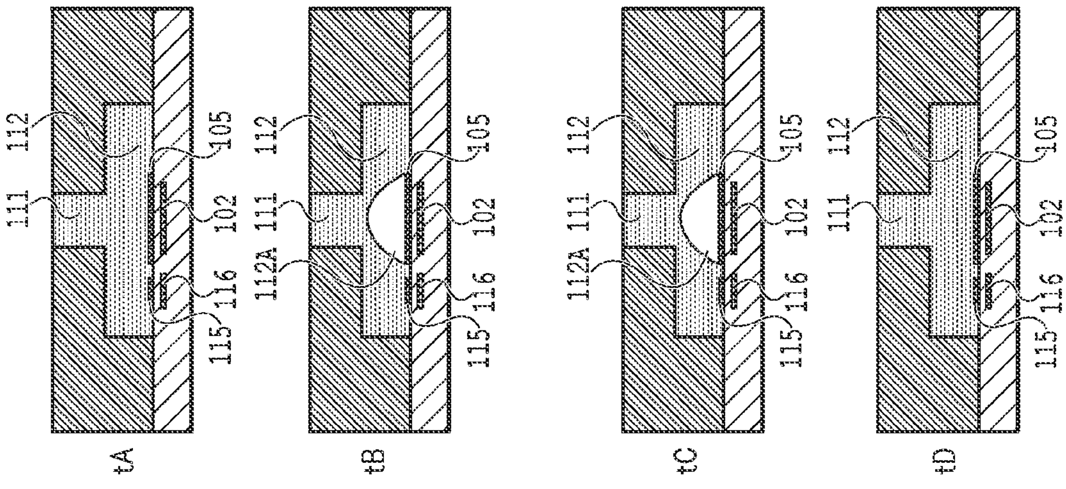
FIG. 6A to FIG. 6C are diagrams explaining the behavior of ink in a foaming chamber accompanying the temperature detection processing shown in FIG. 5A to FIG. 5C.
Figure 6B:
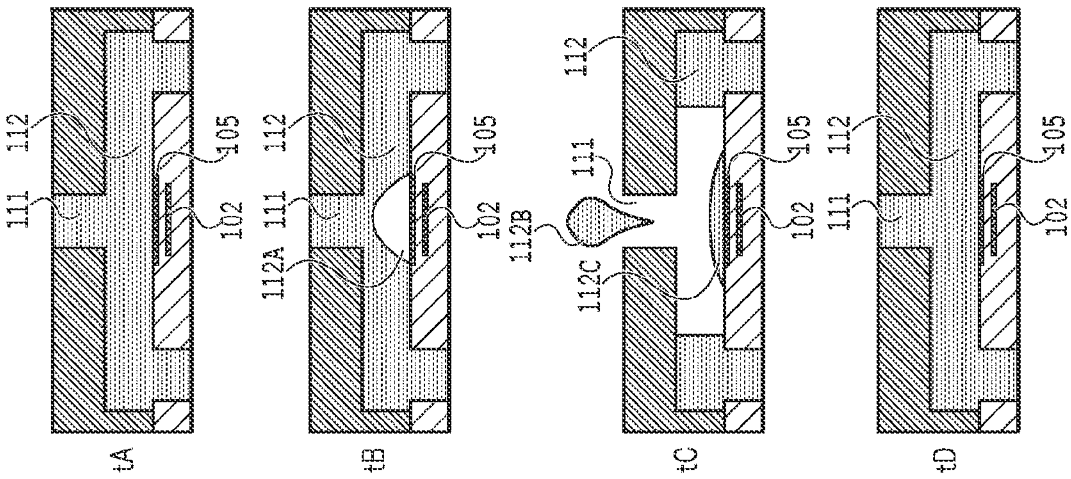
Figure 6A:
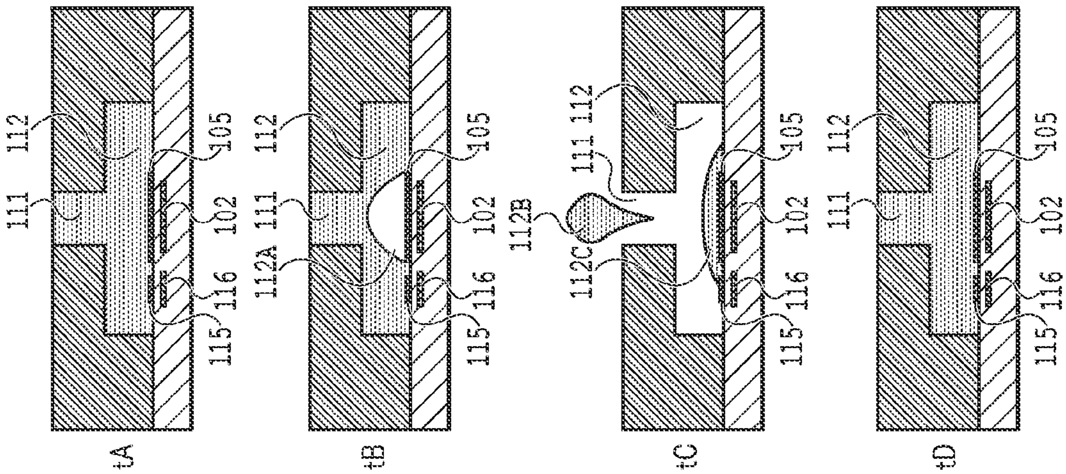

Further, FIG. 6A to FIG. 6C are diagrams explaining the behavior of the ink in the foaming chamber accompanying the temperature detection processing shown in FIG. 5A to FIG. 5C. FIG. 6A and FIG. 6B show the behavior of the ink in a case where the ink is ejected normally and are diagrams corresponding to FIG. 4C and FIG. 4B, respectively. Further, FIG. 6C shows an example of the behavior of ink in a case of ejection failure.

As shown in these drawings, in a case where the driving pulse is applied to the first heating element 102 (a time point tA to a time point tB), in response to the application of heat to the ink by this driving pulse, the temperature of the temperature detection element 115 rises gradually and the output voltage of the temperature detection element 115 also rises gradually (FIG. 5A and FIG. 5C). In this process, an air bubble 112A occurs in the ink within the foaming chamber 112 (FIG. 6A, FIG. 6B, or FIG. 6C).

After that, in a case where the heating pulse is applied to the second heating element 116, the second heating element 116 generates heat and the temperature of the temperature detection element 115 located above the second heating element 116 rises comparatively rapidly and the output voltage thereof also rises (FIG. 5B and FIG. 5C). The power density of the heating pulse to be applied to the second heating element 116 is suppressed to the power density that does not contribute to the ejection of ink. Specifically, it is possible to control the power density by the voltage value of the pulse or the application time (pulse width).

After the above application of the heating pulse, the heat quantity that the temperature detection element 115 receives decreases gradually and the output voltage thereof also decreases similarly. At this time, in a case where ejection is normal (FIG. 6A and FIG. 6B), an ink droplet 112B is ejected from the ejection port 111 by the air bubble 112A having occurred and at the same time, the air bubble 112 contracts and disappears and part of ink 112C separated from the ejected ink droplet retreats into the foaming chamber by the negative pressure that occurs in a case where the bubble disappears (a time point tC). This is the tailing ink or part of the ink droplet and reaches the surface of the substrate 120, which is the surface on the lower side of the foaming chamber, and comes into contact with the surface. As a result of this, the temperature detection element 115 is cooled down rapidly by the above-described part of the ink 112C coming into contact with the temperature detection element 115, and due to this, the output voltage of the temperature detection element 115 decreases comparatively rapidly (solid line in FIG. 5C).

After the refilling of ink is performed accompanying the above ejection operation, the ink interface moves toward the ejection port 111. This is performed by the capillary force within the foaming chamber. In a case where this ink refilling is completed, the state returns to the normal state (a time point tD).

On the other hand, in a case of ejection failure (FIG. 6C), the air bubble 112A grows by the application of the driving pulse to the first heating element 102, but the separation of ink is not performed or insufficient (the time point tC). In the case such as this where ink ejection is defective, it does not happen that the tailing ink described above or part of the ink reaches the surface of the substrate 120 and comes into contact with the surface. Alternatively, the amount of ink coming into contact therewith is insufficient. As a result of that, the output voltage of the temperature detection element 115 decreases comparatively gradually (broken line in FIG. 5C). After this, accompanying the bubble disappearance of the air bubble 112A, the refiling of ink is performed and the state returns to the normal state (the time point tD).

As explained above, a clear difference arise as shown in FIG. 5C between the output voltage of the temperature detection element 115 in a case of normal ejection and that in a case of ejection failure. Here, the point at which the difference in the output voltage of the temperature detection element arises between normal ejection and ejection failure is referred to as a feature point. By the difference in the output voltage at this feature point, it is possible to easily determine whether or not ink ejection is performed normally. As above, according to the present embodiment, it is possible to heat the temperature detection element 115 itself at timing of temperature detection and increase the output of the temperature detection element relating to temperature detection with the second heating element for heating. As a result of that, it is possible to make large the difference in the output power between a case of normal ejection and a case of ejection failure, and therefore, it is made possible to clearly determine the difference in the output at the feature point.

In the above-described explanation, after the driving pulse is applied to the first heating element 102, the heating pulse is applied to the second heating element 116 after a predetermined time, but the aspect is not limited to this. For example, it may also be possible to apply the heating pulse to the second heating element 116 at the same time of the application of the driving pulse to the first heating element 102. This application timing may be any timing as long as it is possible to make large the detection output by the temperature detection element 115 being heated sufficiently in a case where the temperature detection element 115 detects temperature.

The behavior shown in FIG. 5C is an example in which a material having a positive resistance temperature coefficient is used for the temperature detection element 115 and in a case where a material having a negative resistance temperature coefficient is used for the temperature detection element, the trend of the behavior will be opposite.

According to the above embodiment, the temperature detection element 115 is arranged in the same layer as that of the anti-cavitation film 105 and arranged as the metal material located at the position the closest to the ink in the foaming chamber 112. As above, the temperature detection element 115 is located at the position close to the foaming chamber 112 in which the ink exists, which is a temperature change factor, and therefore, it is possible to make the temperature detection element 115 a temperature detection element whose relative sensitivity of detection is high.

Further, according to First Embodiment of the present disclosure, by providing the second heating element 116 heating the temperature detection element 115, it is possible to sufficiently increase the output voltage of the temperature detection element 115, and therefore, it is made possible to obtain a temperature detection element whose relative sensitivity is still higher.

Second Embodiment

Figure 7A:
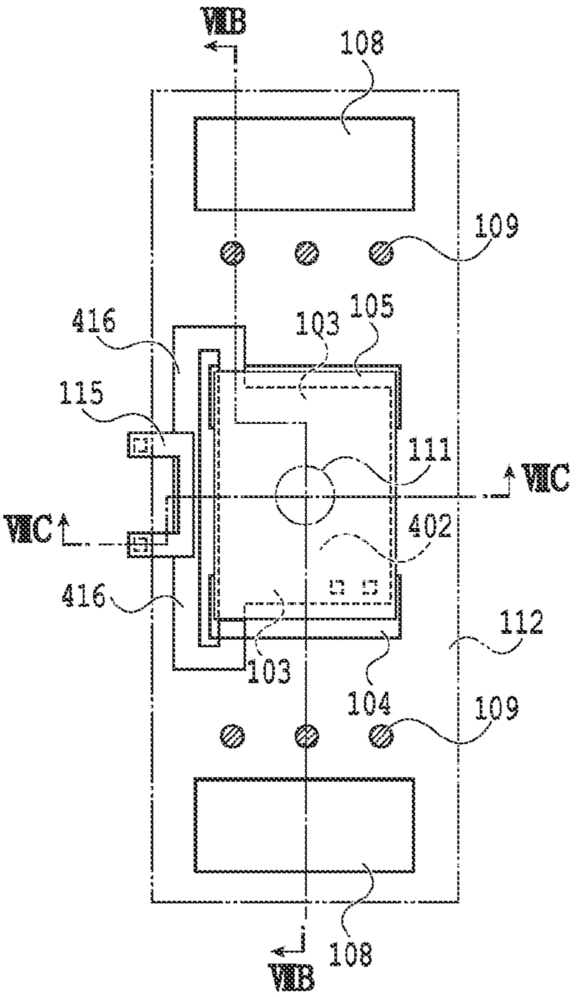
FIG. 7A to FIG. 7C are diagrams showing a structure of an ejection segment of a print head according to Second Embodiment of the present disclosure.
Figure 7B:
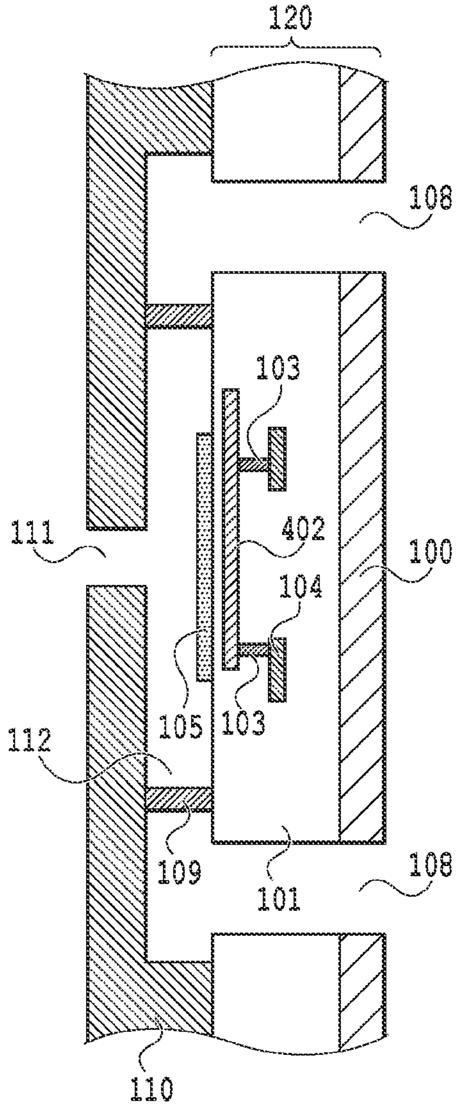
Figure 7C:
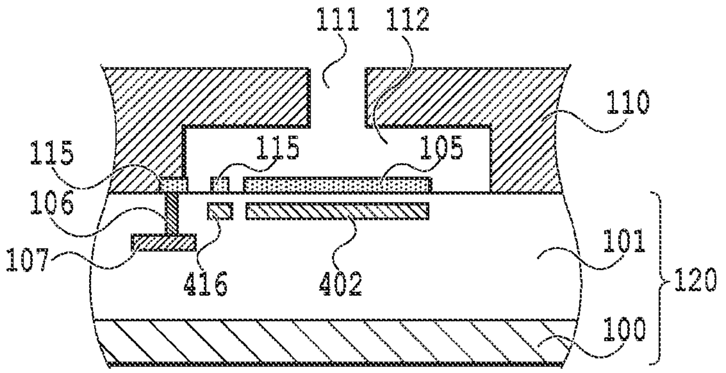

FIG. 7A to FIG. 7C are diagrams showing a structure of an ejection segment of a print head according to Second Embodiment of the present disclosure, which are similar to FIG. 4A to FIG. 4C according to First Embodiment.

Second Embodiment differs from First Embodiment in that the second heating element and the first heating element are connected in parallel to the electric power source. In First Embodiment, the second heating element is driven by a driving pulse different from that of the first heating element, but in the present embodiment, by connecting them in parallel, the second heating element is driven by the same driving pulse as that of the first heating element. Due to this, the dedicated circuit for the heading element for heating is no longer necessary. The other configurations in the ejection segment are the same as those of First Embodiment and in the following, explanation of the same configurations is omitted.

In FIG. 7A to FIG. 7C, in the insulation layer 101, a first heating element 402 and a second heating element 416 are arranged. The first heating element 402 and the second heating element 416 are connected in parallel to the same electric power source. The first heating element 402 and the second heating element 416 are connected to the power supply wiring 104 via the via 103. It is possible to form the first heating element 402 and the second heating element 416 by using same material, for example, such as tantalum silicon nitride and tungsten silicon nitride.

Figure 8:
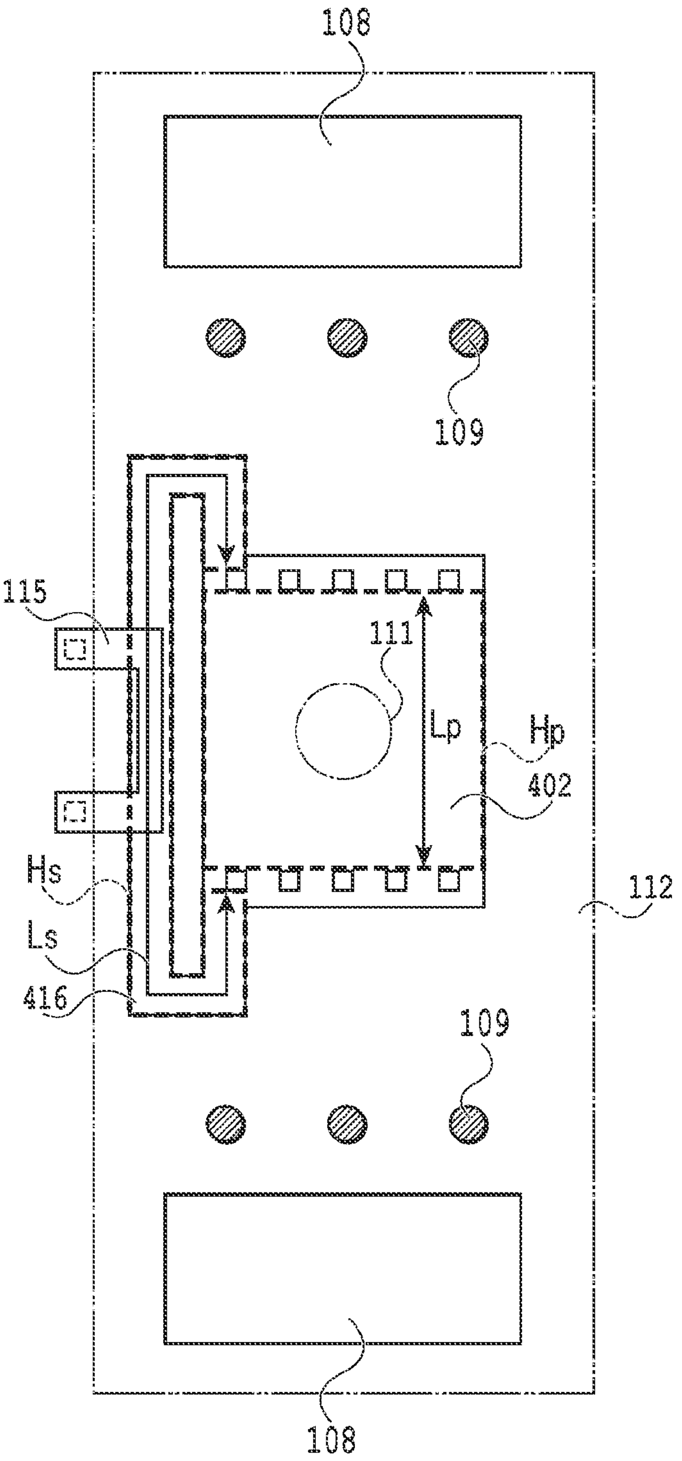
FIG. 8 is a diagram explaining a design example of a second heating element according to Second Embodiment.

FIG. 8 is a diagram explaining a design example of the second heating element 416 according to the present embodiment. In FIG. 8, the relationship of a length Lp between the vias 103 in an effective area Hp of the first heating element 402, a power density Qp of the first heating element 402, a length Ls between the vias 103 in an effective area Hs of the second heating element 416, and a power density Qs of the second heating element 416 is expressed by formula (1) below.

$$Qs=Qp*(Lp/Ls)^2 \quad \text{formula (1)}$$

As is obvious from formula (1), the power density Qs of the second heating element 416 is a value in accordance with a ratio of the length of the effective area of the first heating element 402 and that of the second heating element 416. Due to this, by determining the length Ls of the second heating element 416 to be a predetermined value longer than the length Lp of the first heating element 402, it is possible to make the power density of the second heating element 416 a power density not contributing to the ejection of ink, that is, a power density not causing ejection.

Figures 9A, 9B:
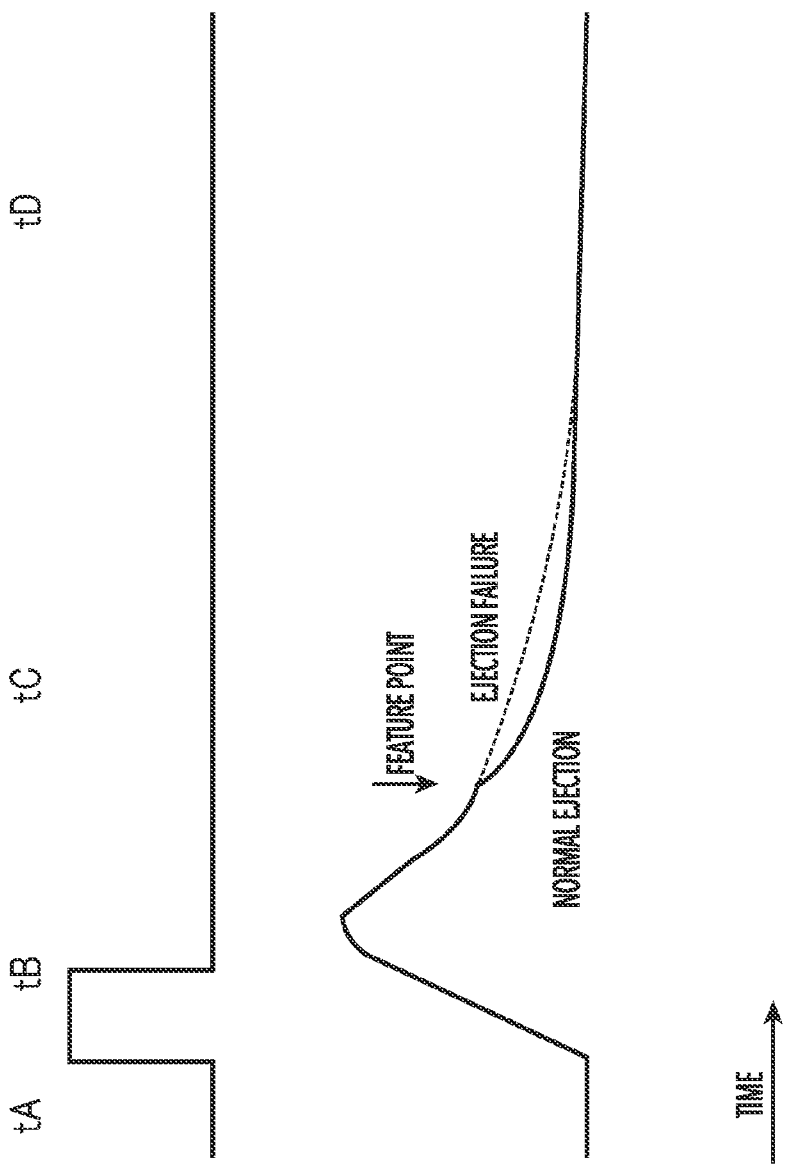
FIG. 9A and FIG. 9B are diagrams explaining temperature detection processing according to Second Embodiment.

FIG. 9A and FIG. 9B are diagrams explaining temperature detection processing according to the present embodiment. FIG. 9A shows the waveform of a driving pulse to be applied to the first heating element 402 and the second heating element 416. FIG. 9B shows the wavelength of an output voltage of the temperature detection element 115, which corresponds to the change in temperature by the above-described driving pulse.

As shown in FIG. 9B, in a case where the same driving pulse is applied to the first heating element 402 and the second heating element 416, the first heating element 402 generates heat and ejects ink. At the same time, the second heating element 416 generates heat, which has the power density determined by the relationship expressed by formula (1) described above, and thereby, the temperature detection element 115 located above the second heating element 416 is heated and the output voltage thereof rises comparatively rapidly (the time point tA to the time point tB). After that, the temperature of the temperature detection element 115 drops gradually and the output voltage thereof also decreases. In this process, a difference arises between a case where ink is ejected normally and a case of ejection failure. As described above in First Embodiment, in a case of normal ejection, by part of the ink droplet separated from the ejected ink droplet, the temperature detection element 115 is cooled down comparatively rapidly and the output voltage decreases rapidly (solid line in FIG. 9B). In contrast to this, in a case of ejection failure, the above-described cooling down of the temperature detection element 115 is not performed or insufficient, and therefore, the rapid decrease in the output voltage does not occur and the output voltage decreases gradually (broken line in FIG. 9B). By this difference in behavior, it is possible to determine the feature point.

Then, in the present embodiment also, it is possible to heat the temperature detection element 115 itself by the second heating element and increase the output of the temperature detection element relating to temperature detection. As a result of that, it is possible to make large the difference in the output voltage between a case of normal ejection and a case of ejection failure, and therefore, it is made possible to clearly determine the difference in the output at this feature point.

Figures 10A, 10B:
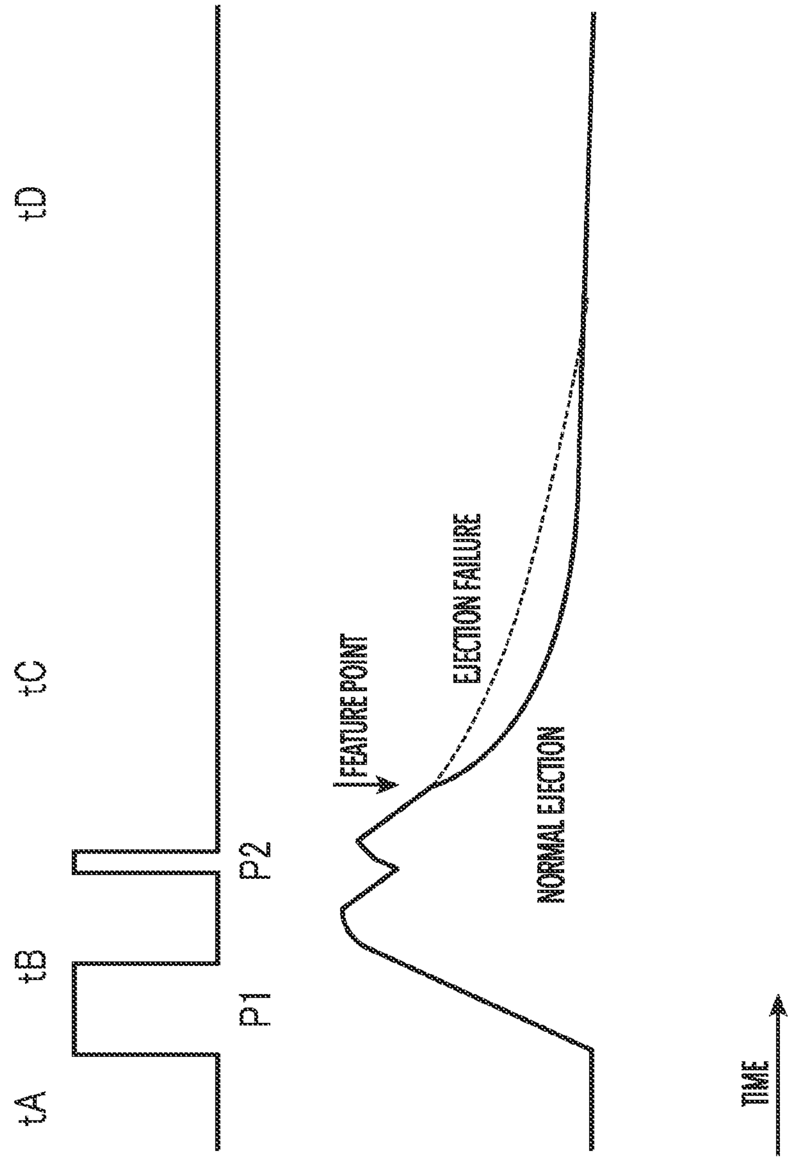
FIG. 10A and FIG. 10B are diagrams explaining another example of the temperature detection processing in an ejection segment structure according to Second Embodiment.

FIG. 10A and FIG. 10B are diagrams explaining another example of the temperature detection processing in the ejection segment structure according to Second Embodiment of the present disclosure and show the same contents as those in FIG. 9A and FIG. 9B. The example shown in FIG. 10A and FIG. 10B relates to an aspect in which after the driving pulse for ejection, a pulse (in the following, also referred to as post pulse) for further heating the temperature detection element 115 is applied.

As shown in FIG. 10A and FIG. 10B, first, a driving pulse P1 is applied to the first heating element 402 and the same driving pulse P1 is also applied to the second heating element 416. Due to this, as in the example shown in FIG. 9, ink is ejected and at the same time, the second heating element 416 generates heat, which has the power density determined by the relationship expressed by formula (1) described above, and thereby, the temperature detection element 115 is heated and the output voltage thereof rises comparatively rapidly (the time point tA to the time point tB). After that, the output voltage of the temperature detection element 115 decreases, but at predetermined timing, a post pulse P2 is applied to the first heating element 402 and the same post pulse P2 is also applied to the second heating element 416. By this application of the post pulse P2, the second heating element 416 further heats the temperature detection element 115, which has the power density in accordance with formula (1) described above. Due to this, the output voltage of the temperature detection element 115 rises again.

As above, by heating the temperature detection element 115 twice, it is possible to further increase the output voltage of the temperature detection element 115 and it is possible to make the feature point clearer for easier determination thereof.

Third Embodiment

Figure 11A:
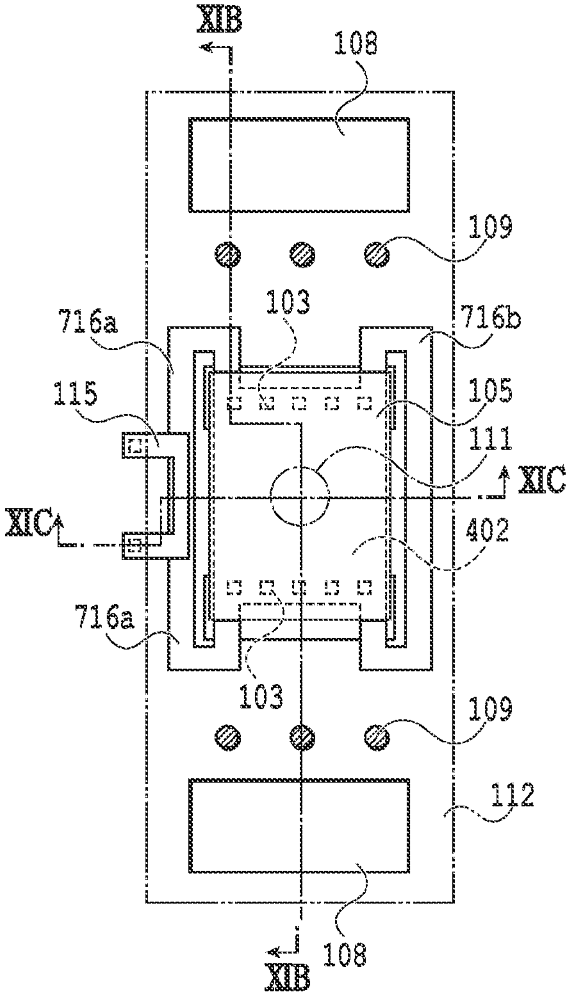
FIG. 11A to FIG. 11C are diagrams showing a structure of an ejection segment of a print head according to Third Embodiment of the present disclosure.
Figure 11B:
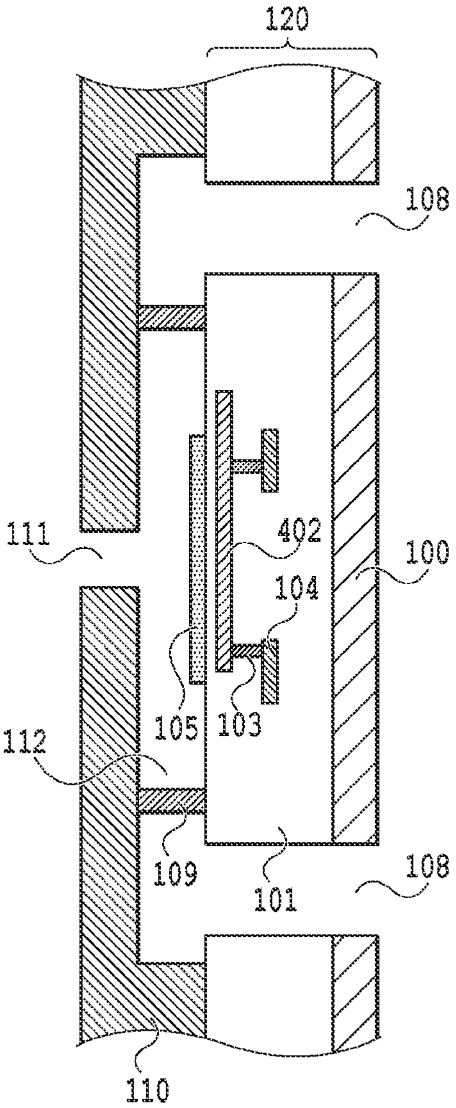
Figure 11C:
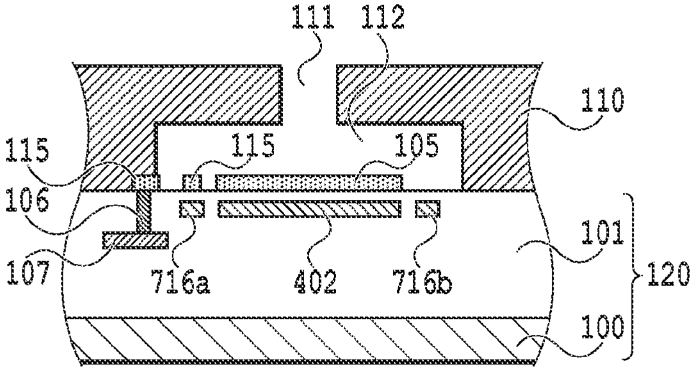

FIG. 11A to FIG. 11C are diagrams showing the structure of an ejection segment of a print head according to Third Embodiment of the present disclosure, which are similar to FIG. 7A to FIG. 7C according to Second Embodiment. Third Embodiment differs from Second Embodiment in that two second heating elements connected in parallel with the first heating element are provided and they are arranged substantially symmetrically. By this symmetrical arrangement, it is possible to improve the ejection stability.

In FIG. 11A to FIG. 11C, in the insulation layer 101, the first heating element 402 and two second heating elements 716*a* and 716*b* are provided. The first heating element 402 and the second heating elements 716*a* and 716*b* are connected in parallel to the same electric power source.

As shown in FIG. 11A, the first heating element 402 and the second heating elements 716*a* and 716*b* are arranged substantially point symmetrically with the ejection port 111 as a center in a plan view. Further, above the second heating element 716*a*, which is one of the two second heating elements 716*a* and 716*b*, the temperature detection element 115 is arranged. In the present embodiment, by the first heating element and the second heating elements being arranged substantially point symmetrically with the ejection port 111 as a center in plan view, more stable ejection in which deflection in the ejection direction or the like does not occur is enabled.

Fourth Embodiment

Figure 12A:
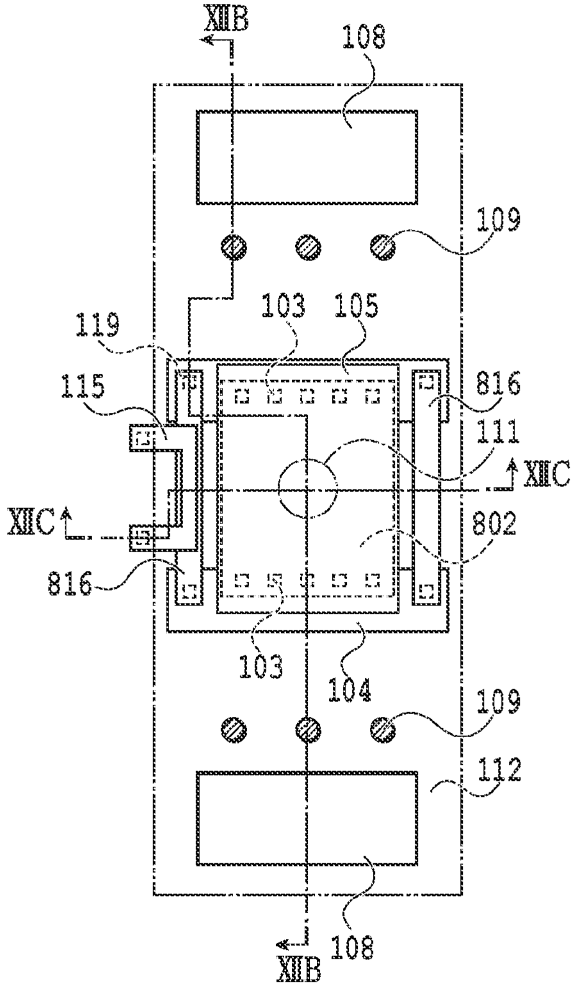
FIG. 12A to FIG. 12C are diagrams showing a structure of an ejection segment of a print head according to Fourth Embodiment of the present disclosure.
Figure 12B:
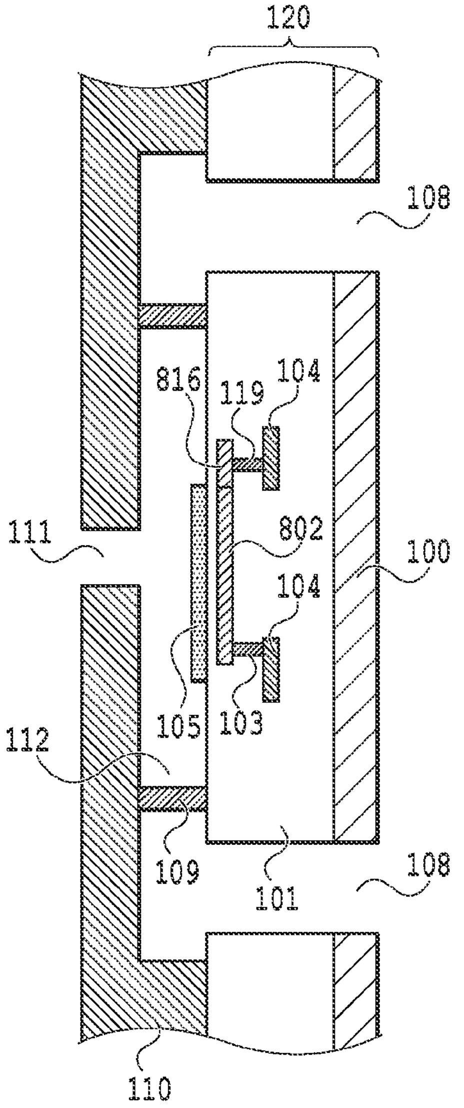
Figure 12C:
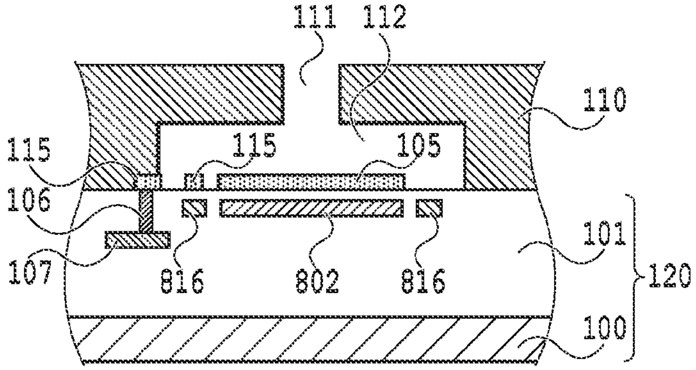

FIG. 12A to FIG. 12C are diagrams showing the structure of an ejection segment of a print head according to Fourth Embodiment of the present disclosure and as in Third Embodiment, an aspect in which two second heating elements are provided symmetrically is shown. Fourth Embodiment differs from Third Embodiment in that the second heating element is not connected with the first heating element. As expressed by formula (1) described previously, the power density Qs of the second heating element depends on the ratio of the length between the first heating element and the second heating element. However, with the structure in which the material of the first heating element and the second heating element is the same and the first heating element and the second heating element are connected directly as in Second Embodiment and Third Embodiment, it is not possible to decrease the length of the second heating element by a predetermined amount or more.

In Fourth Embodiment of the present disclosure, a first heating element 802 and a second heating element 816 are connected to the power supply wiring 104 via the vias 103 and 119, respectively. Further, in the present embodiment also, above the second heating element 816, the temperature detection element 115 is arranged. While with the structure of Second Embodiment such as this, the ratio of the power density Qs of the second heating element to the power density Qp of the first heating element is about 0.7 at the maximum, with the structure of Fourth Embodiment, it is possible to set the ratio to about 0.9, which is the limit of the power density that does not contribute to the ejection of liquid. That is, in the present embodiment, the structure is such that the first heating element and the second heating element are connected to the power supply wiring 104 via the vias 103 and 119, which are not common thereto. Because of this, it is possible to freely design the length of the second heating element. Due to this, it is made possible to obtain still higher relative sensitivity by increasing the power density Qs of the second heating element.

Fifth Embodiment

Figure 13A:
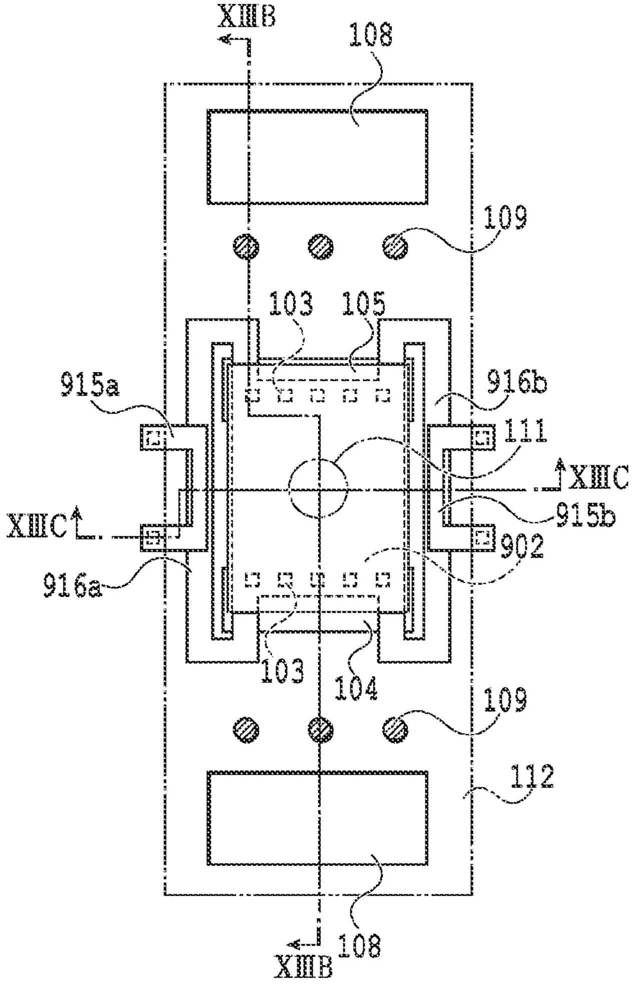
FIG. 13A to FIG. 13C are diagrams showing a structure of an ejection segment of a print head according to Fifth Embodiment of the present disclosure.
Figure 13B:
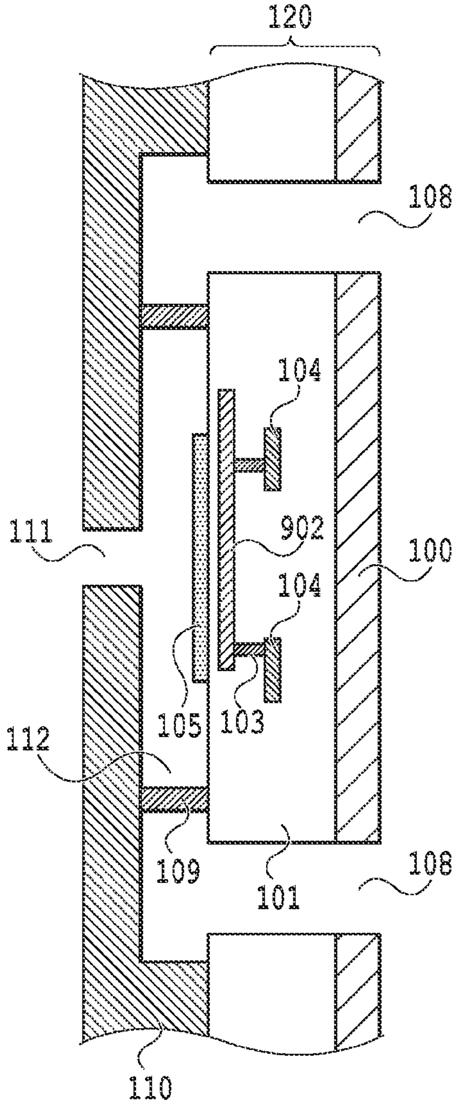
Figure 13C:
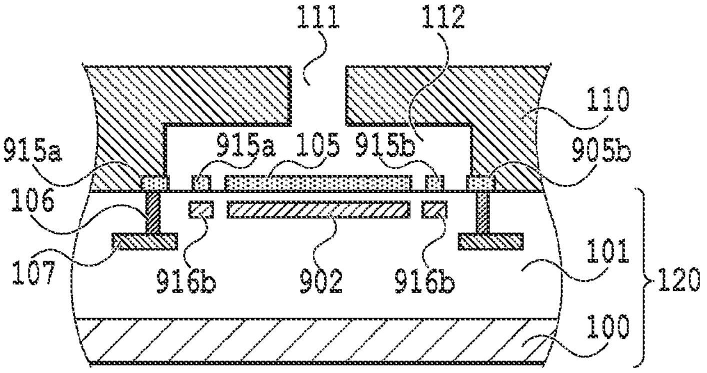

FIG. 13A to FIG. 13C are diagrams showing the structure of an ejection segment of a print head according to Fifth Embodiment of the present disclosure, which are similar to FIG. 11A to FIG. 11C according to Third Embodiment. This ejection segment structure differs from the ejection segment structure according to Third Embodiment in that two temperature detection elements are provided in correspondence to two heating elements. The present embodiment relates to an aspect in which it is possible to improve sensitivity or to make it possible to add a function by increasing the number of temperature detection elements.

In FIG. 13A to FIG. 13C, as in Third Embodiment, inside the insulation layer 101, a first heating element 902 and two second heating elements 916*a* and 916*b* are provided. Further, the first heating element 902 and the two second heating elements 916*a* and 916*b* are connected in parallel to the same electric power source. In the present embodiment, above the second heating element 916*a*, a first temperature detection element 915*a* is arranged and above the second heating element 916*b*, a second temperature detection element 915*b* is arranged, respectively.

Figure 14:
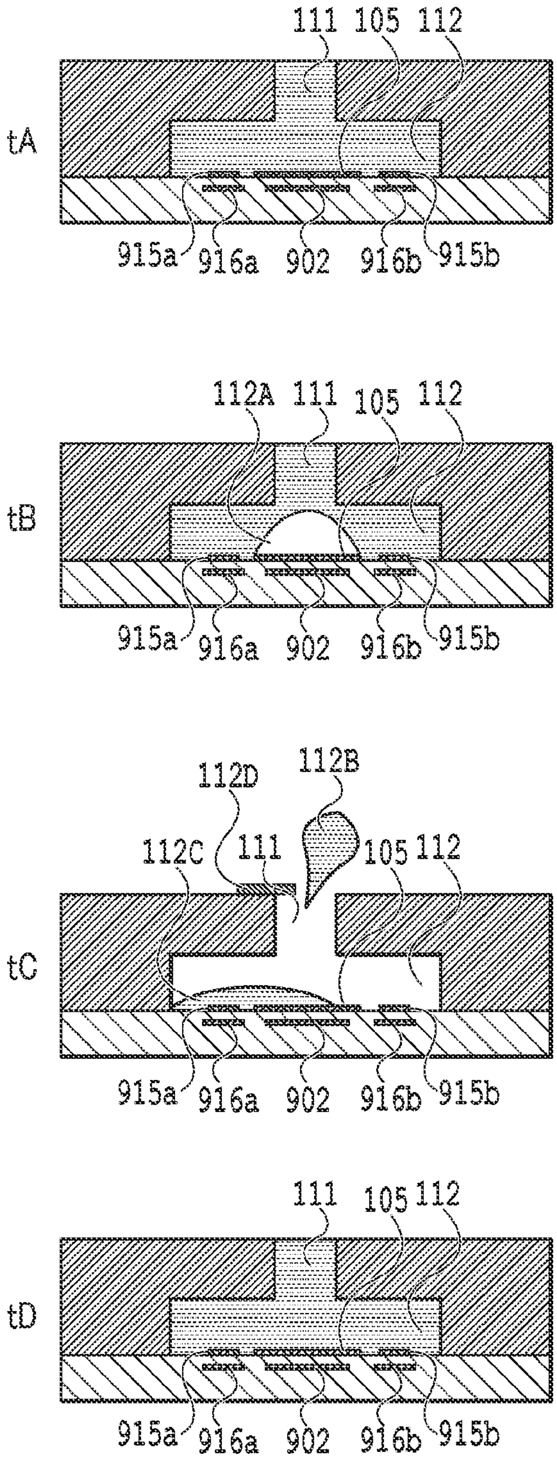
FIG. 14 is a diagram explaining the behavior of ink in a foaming chamber accompanying temperature detection processing according to Fifth Embodiment.

FIG. 14 is a diagram explaining the behavior of the ink in the foaming chamber accompanying the temperature detection processing according to the present embodiment, showing the behavior of the ink in a case where ejection is performed but the ejection fails. In the state where the refilling of ink has been performed in the foaming chamber 112 (the time point tA), in a case where a driving pulse is applied to a first heating element 1002, an air bubble 112A occurs and grows in the ink within the foaming chamber 112 (the time point tB). In a case where the application of the pulse is terminated, the air bubble 112 disappears and accompanying the disappearance, the front portion of the ink is separated and the separated portion is ejected as an ink droplet 112B. A remaining portion 112C except for the separated portion of the ink retreats into the foaming chamber due to the negative pressure that occurs at the time of the bubble disappearance. The remaining ink comes into contact with the surface of the substrate (the time point tC).

At this timing tC of ejection, in a case where a foreign material 112D, for example, such as paper powder, exists in the vicinity of the ejection port 111, the ink droplet 112B is ejected obliquely (with deflection) and lands, for example, at a position deviating from the planned position of a printing medium. In a case where the ink droplet 112B lands on a printing medium at a deviated position, the image becomes defective. Further, in a case where the ink droplet is ejected obliquely, the position at which the remaining ink 112C comes into contact with the surface of the substrate also deviates. In a case where the position at which part of the ink 112C comes into contact with the surface of the substrate deviates as described above, for example, the temperature of the first temperature detection element 915*a*, which is one of the first temperature detection element 915*a* and the second temperature detection element 915*b*, changes rapidly and the temperature of the other second temperature detection element 915*b* changes gradually, and therefore, there arises a difference therebetween. In the present embodiment, by utilizing this, a detailed aspect of ejection failure is detected. That is, it is possible to add a function to further detect that the ejection failure to be detected is the deflection in the ejection direction, which is explained in the embodiment described above, based on the difference in the output between the first temperature detection element 915*a* and the second temperature detection element 915*b*. In the present embodiment, the example is taken in which the two temperature detection elements are used, but the example is not limited to this and an example in which three or more temperature detection elements are used may be acceptable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above embodiments, in the liquid ejection apparatus, it is made possible to clearly detect a difference between normal ejection and ejection failure in a change in temperature of liquid accompanying the ejection of the liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-037881, filed Mar. 10, 2023, which is hereby incorporated by reference herein in its entirety.

What is claimed is:

1. A liquid ejection apparatus using a liquid ejection head and ejecting liquid from the liquid ejection head, the liquid ejection apparatus comprising:
- a driving unit configured to drive a heating element; and
- a detection unit configured to detect an ejection state of the liquid ejection head based on an output from a temperature detection element provided in the liquid ejection head in a case where the driving unit drives the heating element to eject liquid from an ejection port of the liquid ejection head, wherein
- the liquid ejection head includes, in correspondence to the ejection port:
  - a foaming chamber communicating with the ejection port;
  - a first heating element for ejecting liquid from the ejection port by providing thermal energy to liquid in the foaming chamber;
  - the temperature detection element for detecting temperature in the foaming chamber; and
  - a second heating element generating thermal energy and arranged closer to the temperature detection element than the first heating element,
- the first and second heating elements are provided in a substrate of the liquid ejection head, and
- the temperature detection element is provided above the second heating element on a surface of the substrate facing the foaming chamber.

2. The liquid ejection apparatus according to claim 1, wherein
- the temperature detection element is provided so that at least part of the temperature detection element exists within the foaming chamber on the surface of the substrate facing the foaming chamber.

3. The liquid ejection apparatus according to claim 1, wherein
- the first heating element and the second heating element are connected in parallel to the same electric power source.

4. The liquid ejection apparatus according to claim 3, wherein
- a length of an effective area of each of the first heating element and the second heating element is determined so that thermal energy generated by a power density of the second heating element does not cause air bubbles to occur in liquid.

5. The liquid ejection apparatus according to claim 4, wherein
- the driving unit drives the first heating element and the second heating element at the same time.

6. The liquid ejection apparatus according to claim 5, wherein the driving unit drives the second heating element to generate thermal energy after driving the first heating element to eject liquid.

7. The liquid ejection apparatus according to claim 1, wherein the first heating element and the second heating element are formed of the same material.

8. The liquid ejection apparatus according to claim 1, wherein above the first heating element on the surface of the substrate facing the foaming chamber, an anti-cavitation film is provided, and the temperature detection element is formed of the same material as that of the anti-cavitation film.

9. The liquid ejection apparatus according to claim 8, wherein the anti-cavitation film contains an effective area of the first heating element on the surface facing the foaming chamber.

10. The liquid ejection apparatus according to claim 1, wherein two second heating elements are provided symmetrically with respect to the ejection port.

11. The liquid ejection apparatus according to claim 10, wherein a plurality of temperature detection elements is provided symmetrically with respect to the ejection port.

12. The liquid ejection apparatus according to claim 1, wherein the driving unit controls thermal energy generated by the second heating element so that air bubbles do not occur in liquid.

13. A liquid ejection head for ejecting liquid from an ejection port, the liquid ejection head comprising, in correspondence to the ejection port:

a foaming chamber communicating with the ejection port;

a first heating element for ejecting liquid from the ejection port by providing thermal energy to liquid in the foaming chamber;

a temperature detection element for detecting temperature in the foaming chamber; and a second heating element generating thermal energy and arranged closer to the temperature detection element than the first heating element, wherein the first and second heating elements are provided in a substrate of the liquid ejection head, and the temperature detection element is provided above the second heating element on a surface of the substrate facing the foaming chamber.

14. The liquid ejection head according to claim 13, wherein the temperature detection element is provided so that at least part of the temperature detection element exists within the foaming chamber on the surface of the substrate facing the foaming chamber.

15. The liquid ejection head according to claim 13, wherein the first heating element and the second heating element are connected in parallel to the same electric power source.

16. The liquid ejection head according to claim 13, wherein the first heating element and the second heating element are formed of the same material.

17. The liquid ejection head according to claim 13, wherein above the first heating element on the surface of the substrate facing the foaming chamber, an anti-cavitation film is provided, and the temperature detection element is formed of the same material as that of the anti-cavitation film.

18. The liquid ejection head according to claim 17, wherein the anti-cavitation film contains an effective area of the first heating element on the surface facing the foaming chamber.

* * * * *